No. 775,075. PATENTED NOV. 15, 1904.
W. A. COURTLAND.
HOOK FEEDING MECHANISM FOR HOOK AND EYE FASTENING MACHINES.
APPLICATION FILED MAY 1, 1901.
NO MODEL. 3 SHEETS—SHEET 1.

Witnesses. Inventor.

No. 775,075. PATENTED NOV. 15, 1904.
W. A. COURTLAND.
HOOK FEEDING MECHANISM FOR HOOK AND EYE FASTENING MACHINES.
APPLICATION FILED MAY 1, 1901.
NO MODEL. 3 SHEETS—SHEET 2.

Witnesses.
Inventor.

No. 775,075. PATENTED NOV. 15, 1904.
W. A. COURTLAND.
HOOK FEEDING MECHANISM FOR HOOK AND EYE FASTENING MACHINES.
APPLICATION FILED MAY 1, 1901.
NO MODEL. 3 SHEETS—SHEET 3.
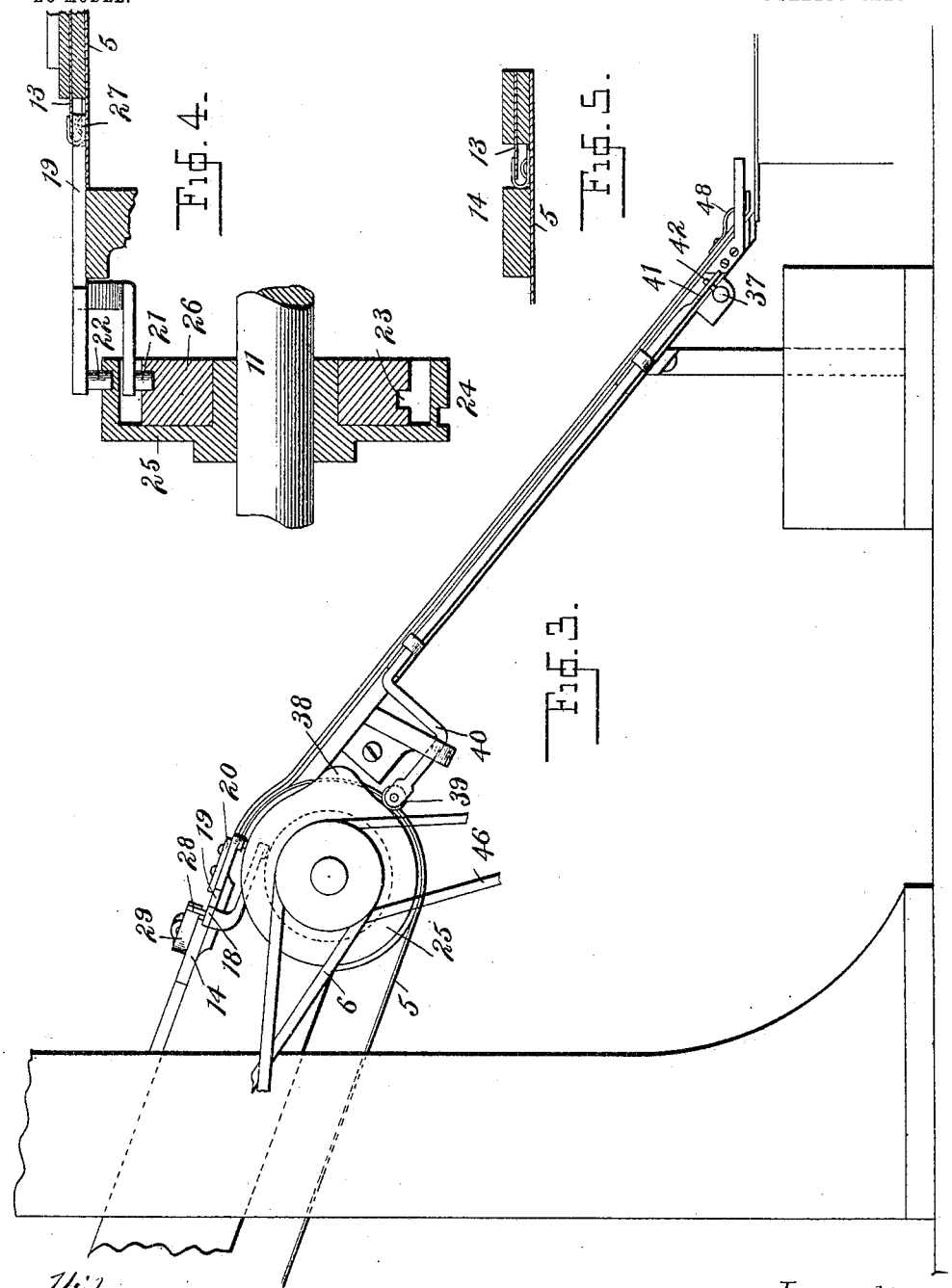
Witnesses. Inventor.

No. 775,075.                                               Patented November 15, 1904.

UNITED STATES PATENT OFFICE.

WILLIAM A. COURTLAND, OF NEW YORK, N. Y., ASSIGNOR TO AMERICAN PIN COMPANY, OF WATERBURY, CONNECTICUT, A CORPORATION OF CONNECTICUT.

HOOK-FEEDING MECHANISM FOR HOOK-AND-EYE-FASTENING MACHINES.

SPECIFICATION forming part of Letters Patent No. 775,075, dated November 15, 1904.

Application filed May 1, 1901. Serial No. 58,269. (No model.)

*To all whom it may concern:*

Be it known that I, WILLIAM A. COURTLAND, a citizen of the United States, residing at New York, in the county and State of New York, have invented certain new and useful Improvements in Hook-Feeding Mechanism for Hook-and-Eye-Fastening Machines, of which the following is a specification.

It relates particularly to a hook-feeding mechanism adapted for use in the machine for fastening hooks and eyes on cards, for which Letters Patent No. 710,517 were granted October 7, 1902, to George Rowbottom.

The special object of this invention is to prevent any possibility of hooks clogging or jamming in the hook-race by riding over one another. Owing to unavoidable differences in the dimensions of the hooks it is difficult to make the chute or race fit the hooks so closely as to absolutely prevent occasional jamming due to a hook riding under or over the hook in advance. To prevent such jamming, I provide mechanism that allows the hooks to descend the chute singly or in separate order, so that they cannot possibly jam. An apron is provided, as in the application aforesaid, which delivers the hooks in definite relation to the race, and at the point of delivery from the apron I provide an escapement which feeds the hooks forward one at a time.

Figure 1:
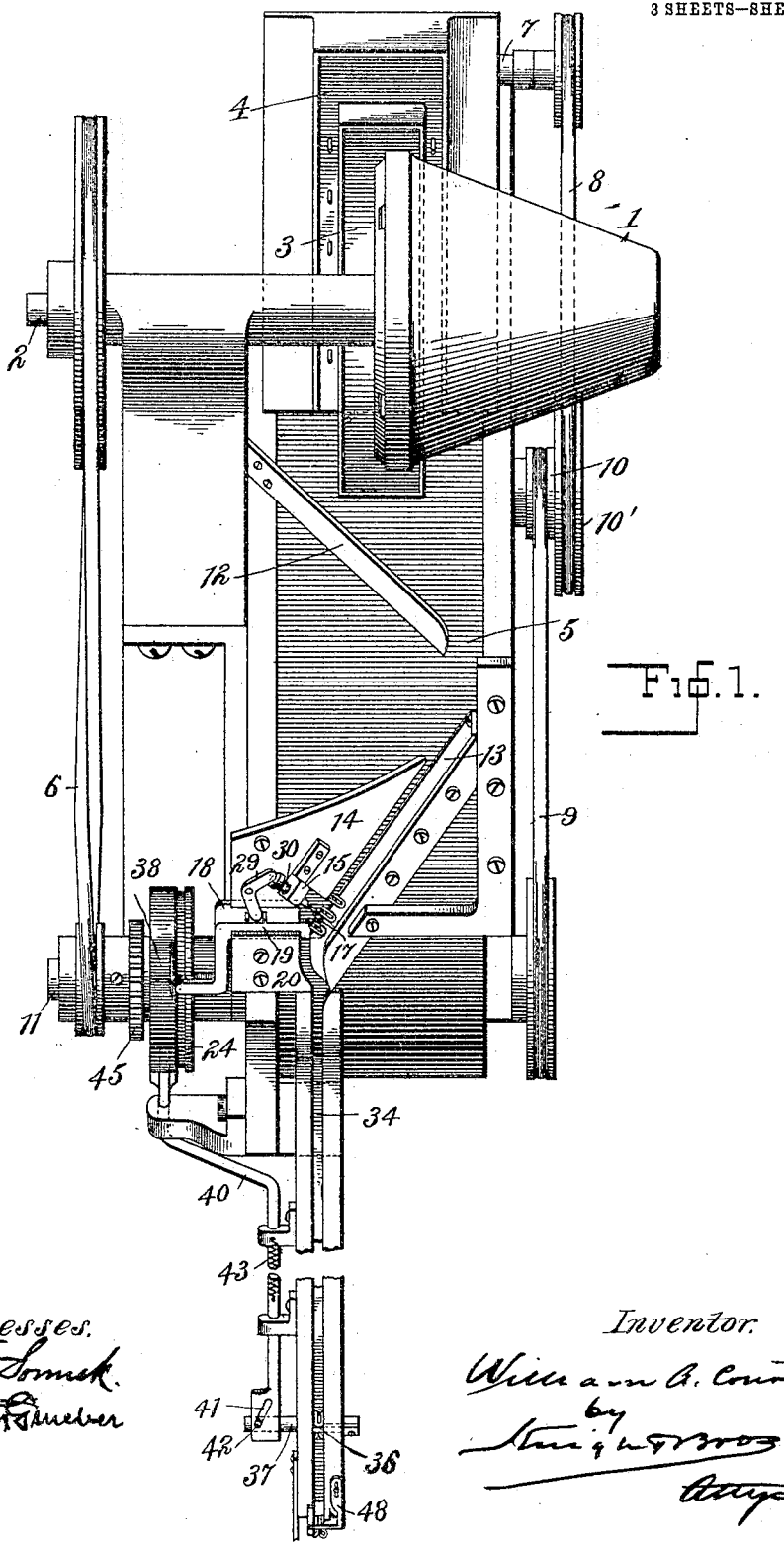
Figure 2:
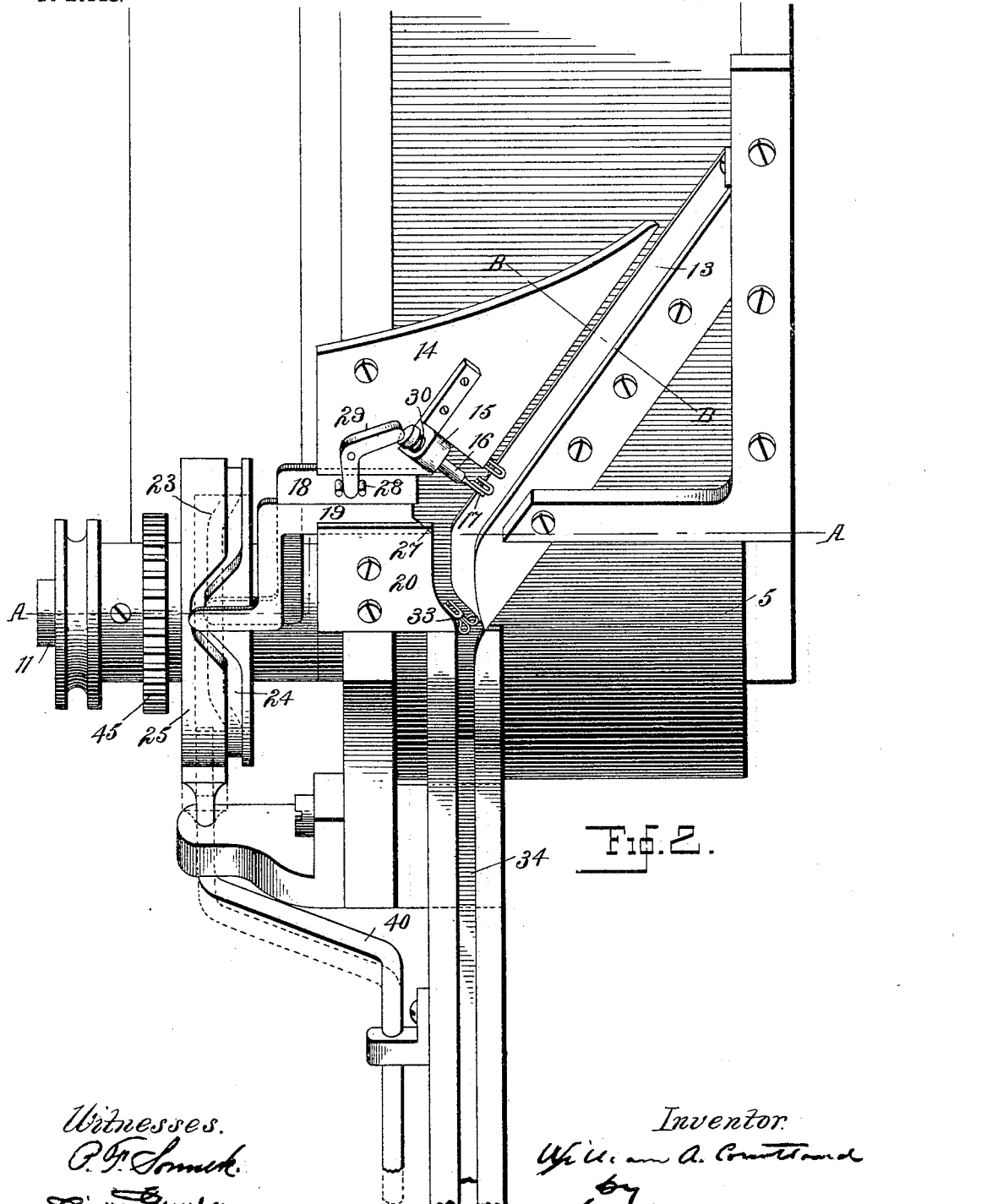

In the accompanying drawings, Figure 1 is a plan view of the entire hook-feeding means, showing my invention applied thereto. Fig. 2 is a plan view of the hook-feeding escapement and its actuating means. Fig. 3 is a side view of the hook-chute and the adjacent part of the feeding-apron. Figs. 4 and 5 are sections on the lines A A and B B in Fig. 2.

Referring to Fig. 1, the hook-receptacle 1 is mounted to rotate on a shaft 2 and discharges the hooks gradually into a casing 3, from which they pass to a tray 4 and thence onto the apron, belt, or conveyer 5. The receptacle 1 is rotated by belt 6, and the tray 4 is operated by shaft 7, driven by belt 8, in such manner that all or almost all the hooks are delivered to the belt or conveyer 5 in righted position—that is, lying with the hook-tip uppermost. Belt 9 serves to drive the pulley 10 and the attached pulley 10' and through that the belt 8 from the shaft 11, which carries the lower apron-roller, and said shaft 11 is operated by power supplied to a wheel 45 thereon by a belt or chain 46. These features are shown in the application above referred to and form no part of my invention. The obliquely-directed blade 12 and oblique positioning rail or guide 13, whereby the hooks are first swept to one side of the apron and then caught on rail 13 in definite position or arrangement with the hook-tips extending over the top of the rail, are also the same as in the above-named application. I have not here shown any clutch for disconnecting the hook-feeding devices, as in that application; but such may be used, if desired.

Facing the rail 13 with enough clearance to permit a single row of hooks to pass between it and said rail is a guard-plate 14, whose upper edge is curved obliquely downward, so as to deflect to one side and carry off any hooks that owing to their lying hook down or on their side fail to enter the passage between the guard and the rail 13. On this guard-plate is a bracket 15, in which slides a bar or slide 16, carrying a finger 17, adapted to engage between the hooks lying at the lower end of the rail 13 and prevent downward or forward movement of same. Two slide-bars 18 19, guided in suitable guide or track between the plate 14 and a lower guard-plate 20 and sliding side by side, have extensions or arms which carry rolls 21 22, engaging in cam-slots 23 24 in cam-wheels 25 26, fastened together and to the shaft 11. The slide-bar 19 has a finger or shoulder 27, adapted to enter the passage between the lower guard-plate 20 and the lower end of rail 13 and to check the passage of hooks therein, while the upper slide-bar 18 engages by pins 28 a lever 29, pivoted to the upper guard-plate 14, and engaging the slide or bar 16 to push the finger 17 thereon into the hook-passage, a spring 30 acting to push said slide back to remove said finger from the passage. The slide-bars 18 19 are operated successively or alternately by the cam-slots 23 24. Normally the lower slide-bar 19 is held in its innermost position with its finger blocking the hook-passage, while the upper finger 17 is withdrawn, allowing the line of hooks to descend until a hook rests on the lower finger 27. As the cams 25 26 rotate, the offset portion of cam-slot 23 first moves the slide 16 to push its finger into the hook-passage and will then continue to hold this finger in such position while the other cam-slot 24 operates the lower slide 19 by a quick to-and-fro movement to release the hook resting thereon, said hook then being thrown quickly forward by the action of the belt or conveyer 5, the lower slide returning to normal position to block the hook-passage, and finally the cam-slot 23 returning the upper slide to normal position and withdrawing the upper finger to allow another hook to pass to the lower finger. The arrangement of the cam-slots to effect this result, the cam-slot 23 overlapping the cam-slot 24 at both beginning and ending of the operation, is indicated in Fig. 2, wherein the cam-slot 23 is shown in dotted lines.

The alternately-reciprocated fingers 17 and 27 form a feed-controlling mechanism which operates to intermit the continuous feed of the hooks before they enter the raceway or chute. The continuous feed of the hooks by the conveyer 5 is interrupted and an intermittent feed of the hooks one at a time is caused, so that the hooks are delivered singly to the chute. This intermittent feed-controlling mechanism acts conjointly with the conveyer, and the hooks, segregated one from the other by the reciprocating fingers 17 and 27, are carried forward by the conveyer to the entrance end of the chute. There is therefore no opportunity for the hooks to clog in the chute or at the entrance end thereof and no possibility of their riding one over the other.

From the above-described escapement mechanism the hook passes along the passage between guard-plate 20 and rail 13, which passage is parallel to the direction of movement of the belt, the hook, or the tip thereof, striking a rounded shoulder 33 at the end of the guard-plate 20, and being thereby turned into parallelism with the belt and with the hook-chute or race 34, with its hook end at the rear and its sewing-eye end to the front. The hook then passes by the action of belt 5 and its own weight into the hook chute or race 34, down which it slides till it reaches a dog or detent-finger 36, interposed in said chute and carried by a slide 37, operated alternately with the escapement-finger 27. This operation I prefer to effect from the cam-shaft 11 by means of a cam projection 38 on outer cam-wheel 26, engaging a roll 39 on a slide-bar 40, guided in brackets on chute 34 and having an inclined slot 41, in which engages a pin 42 on the slide 37, so that in each rotation of the cam-wheel 26 bar 40 and slide 37 will be given a to-and-fro stroke to release the hook resting on the detent-finger 36. A spring 43 returns the bar 40 toward the cam-wheel 26. When the hook is released by withdrawal of detent-finger 37, it passes to the bottom of the hook-race and is stopped there by a spring 48 in the manner set forth in the aforesaid application.

The operation of the device is as follows: The hooks are fed from the receptable 1 and conveyed by the tray 3 and the belt 5 in such manner that when they reach the rail 13 they will be collected on said rail in regular order and will pass downward along same, the hook ends extending up between the rail 13 and guard-plate 14. Their passage from the rail 13 into and down the chute 34 will be controlled by the escapement and detent devices in the following manner: Normally, as shown in Fig. 1, upper finger 17 is withdrawn and lower escapement-finger 27 is checking the passage of the hooks on the rail 13. A hook is also resting on the detent 36, and another hook is at the bottom of the chute against the spring 48. The next operation of the machine will withdraw the last-named hook in the manner described in the application above referred to, and after this has taken place the cam projection 38 will operate slide-bar 40 to open the detent-finger 36, allowing the hook thereon to fall to the bottom of the race, said bar returning immediately, so as to reset the finger 36 in position to receive another hook. The cam-slots 23 24 at the top of the race now come into action in the manner above described to allow another hook to descend to the detent 37, and this operation is thereafter repeated indefinitely.

The escapement device above described will of course obviate any liability of the hooks to stick or jam in the chute, as only one book passes down at a time. It is not possible for the hooks to jam on the conveyer, as they rest side by side on the rail, and the jamming action in the chute has heretofore been mainly due to the tendency of the sewing-eyes to run under the rounded rear end of the next hook, there being little tendency of the sewing-eyes to run under one another. Moreover, the fact that a positively-moving conveyer is drawing the hooks continually forward in the chute effectually prevents any sticking, and if two hooks did become jammed together the interposition of the upper escapement-finger would necessarily separate them, and the lower hook would be dragged forward by the conveyer.

Having thus described my invention, the following is what I claim as new therein and desire to secure by Letters Patent:

1. In a machine of the character described the combination of a positioning-guide and a delivery-chute, a conveyer to feed the articles continuously along said guide and to the chute, and means located between the guide and the chute to intermit the feed and present the articles one by one to the chute, said means adjacent the conveyer and coöperating therewith, substantially as described.

2. The combination of a positioning rail or guide and a delivery-chute, a continuous feed mechanism for feeding the articles to and along the guide and to the chute, a feed-controlling mechanism at the entrance end of the chute to interrupt the continuous feed and deliver the articles one by one to the chute, said continuous feeding mechanism adjacent the feed-controlling mechanism and coöperating therewith to segregate the articles and deliver the same to the chute.

3. The combination of a positioning rail or guide and a delivery-chute, a continuous feed mechanism for feeding the articles to and along the guide and to the chute, a feed-controlling mechanism comprising alternately-operating members to control the feed of the articles and deliver them one by one to the chute, the continuous feed mechanism adjacent the feed-controlling mechanism and acting conjointly therewith directly upon the articles.

4. The combination of a positioning rail or guide, a delivery-chute, a continuously-traveling conveyer to carry the articles to and along the guide and to the chute, a feed-controlling mechanism located at the entrance of the chute, said mechanism operating to interrupt the continuous feed of the articles and deliver them one at a time to the chute, the conveyer arranged adjacent the feed-controlling mechanism and acting directly upon the articles as they pass the feed-controlling mechanism.

5. The combination of a positioning rail or guide, a delivery-chute, a continuously-traveling conveyer arranged adjacent the chute, a feed-controlling mechanism located at the entrance to the chute, said mechanism comprising alternately-operating members located adjacent the delivery end of the conveyer and means to reciprocate said members across the path of the articles for the purpose described.

6. The combination with the hook-race and means for feeding hooks thereto, of an escapement device controlling the passage of hooks from said feeding device to said race and comprising alternately-acting fingers, a detent located in the hook-race and acting alternately with the escapement-finger which is nearest same, and means for operating said escapement and detent, said means comprising a shaft, and three cam devices operated thereby and respectively connected to operate the two escapement-fingers and the detent.

7. The combination of a continuously-traveling conveyer, a positioning rail or guide adjacent said conveyer to position and guide the articles carried thereby, means to deflect the articles on the conveyer toward said guide, a chute at the delivery end of said conveyer, a feed-controlling mechanism coöperating with said conveyer and arranged adjacent its delivery end, said feed-controlling mechanism comprising alternately-reciprocated members arranged in the path of the articles carried by the conveyer, one of said members acting to arrest the continuous feed of the articles and segregate the foremost article from the articles in rear thereof, the other reciprocating member acting to release the segregated article, and permit it to be carried by the conveyer to the chute.

8. The combination of a continuously-traveling conveyer, a positioning rail or guide adjacent the conveyer for positioning the articles carried thereby, a delivery-chute to receive the article from the conveyer, means to deflect improperly-positioned articles from said chute, a feed-controlling mechanism at the entrance of the chute, said feed-controlling mechanism comprising alternately-reciprocated members acting upon the articles while upon the conveyer, a detent device at the delivery end of the chute, said detent device acting alternately with the feed-controlling device.

9. The combination of a positioning rail or guide, a delivery-chute, a conveyer for carrying articles continuously along said rail or guide and to the chute, a feed-controlling mechanism at the entrance of the chute, said feed-controlling mechanism comprising a pair of fingers, a shaft, cams mounted on the shaft and engaging said fingers to reciprocate said fingers alternately across the line of feed, the fingers acting upon the articles while upon the conveyer, and detent devices at the delivery end of the chute having operative connections with said shaft and operating alternately with the finger of the feed-controlling mechanism nearest the detent device.

WM. A. COURTLAND.

Witnesses:
 A. P. KNIGHT,
 J. GREEN.